(12) United States Patent
Tsuda

(10) Patent No.: US 9,042,706 B2
(45) Date of Patent: *May 26, 2015

(54) IMAGE PROCESSING APPARATUS AND IMAGE PROCESSING METHOD

(71) Applicant: CANON KABUSHIKI KAISHA, Tokyo (JP)

(72) Inventor: Yuji Tsuda, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/279,187

(22) Filed: May 15, 2014

(65) Prior Publication Data

US 2014/0248035 A1 Sep. 4, 2014

Related U.S. Application Data

(63) Continuation of application No. 12/635,913, filed on Dec. 11, 2009, now Pat. No. 8,761,576.

(30) Foreign Application Priority Data

Dec. 18, 2008 (JP) ................................. 2008-322664

(51) Int. Cl.
*H04N 5/94* (2006.01)
*H04N 5/915* (2006.01)
*H04N 5/77* (2006.01)
*H04N 9/82* (2006.01)
*H04N 21/4223* (2011.01)
*H04N 21/432* (2011.01)
*H04N 21/433* (2011.01)
*H04N 21/4402* (2011.01)
*H04N 21/81* (2011.01)

(52) U.S. Cl.
CPC ............... *H04N 5/915* (2013.01); *H04N 5/772* (2013.01); *H04N 9/8227* (2013.01); *H04N 21/4223* (2013.01); *H04N 21/4325* (2013.01); *H04N 21/4334* (2013.01); *H04N 21/4402* (2013.01); *H04N 21/8153* (2013.01); *H04N 21/816* (2013.01)

(58) Field of Classification Search
None
See application file for complete search history.

(56) References Cited

U.S. PATENT DOCUMENTS

2006/0093318 A1* 5/2006 Cohen et al. ................... 386/68
2008/0050090 A1* 2/2008 Iwanaga ........................ 386/82
2008/0235742 A1* 9/2008 Osaki et al. .................. 725/100
2009/0119583 A1* 5/2009 Kihara et al. ................. 715/273

* cited by examiner

*Primary Examiner* — William C Vaughn, Jr.
*Assistant Examiner* — Eileen Adams
(74) *Attorney, Agent, or Firm* — Canon USA, Inc. IP Division

(57) ABSTRACT

An image processing apparatus includes a generation unit configured to continuously generate still images from a moving image which is being read out from a recording medium and played back, a detection unit configured to detect a change of a playback state of the moving image which is being read out from the recording medium and played back, and a control unit configured to control an operation of the generation unit. The control unit performs control to stop generating of the still image when the detection unit detects that the playback state of the moving image during playback is changed.

6 Claims, 5 Drawing Sheets

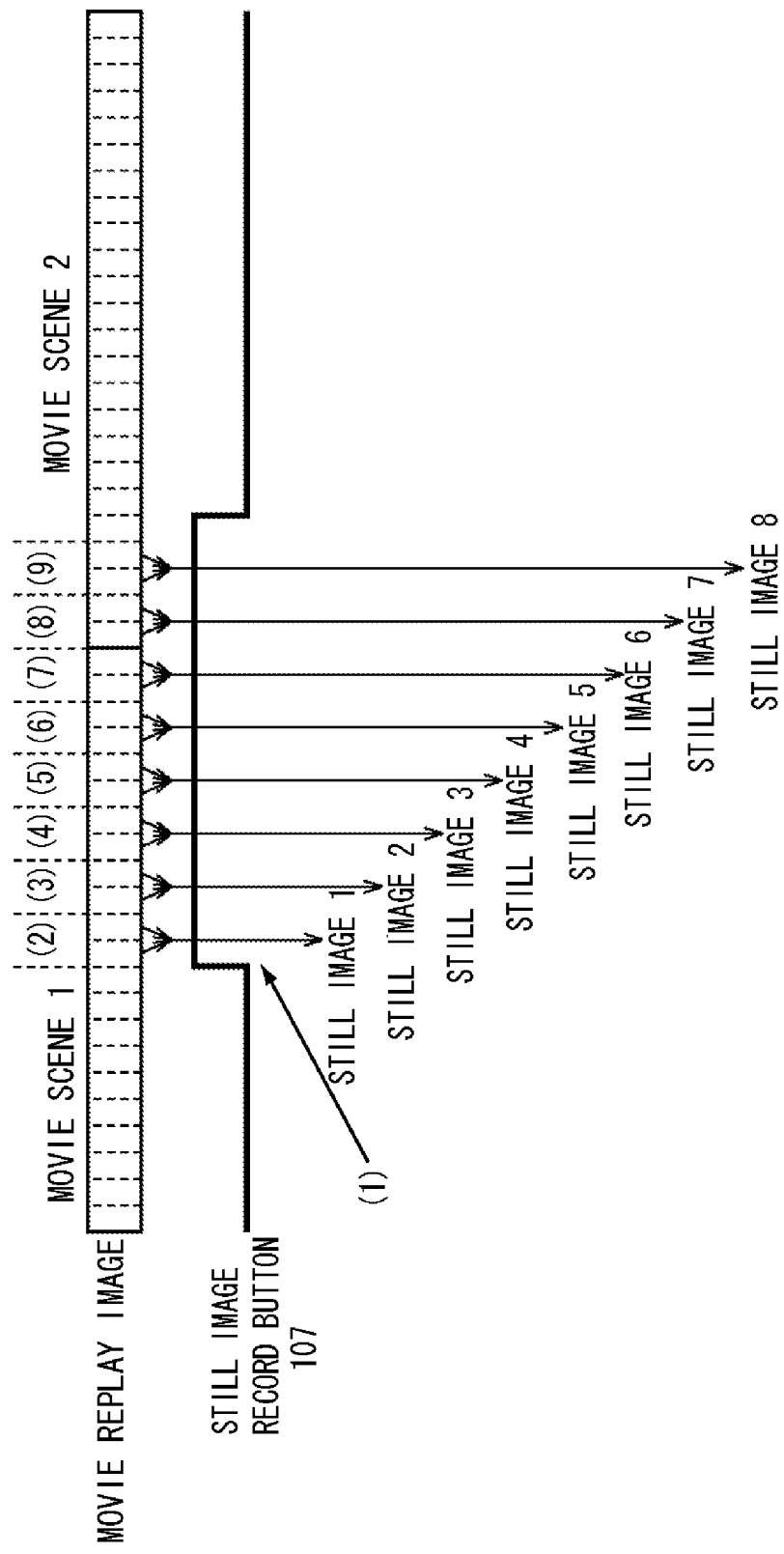

IMAGE PROCESSING APPARATUS AND IMAGE PROCESSING METHOD

CROSS-REFERENCE TO RELATED APPLICATION

This application is a Continuation of U.S. application Ser. No. 12/635,913, filed Dec. 11, 2009, which claims priority from Japanese Patent Application No. 2008-322664 filed Dec. 18, 2008, which are hereby incorporated by reference herein in their entireties.

BACKGROUND OF THE INVENTION

1. Field of the Invention

The present invention relates to an image processing apparatus and an image processing method, and more specifically, to a technology suitable for continuously generating still images from a moving image.

2. Description of the Related Art

In recent years, as shown by rapid growth of digital cameras, a charge coupled device (CCD) had higher resolution, a memory had a larger capacity, and the image processing technology has been improved. Along with such improvements, demand for video cameras which can pick up not only the moving image but also the still image are increased.

However, when a beginner of a user shoots an object by using such a video camera, it is very difficult as a shooting technique to simultaneously shoot the moving image and the still image, which causes a big burden for the user.

Thus, in order to resolve such situation, an image pick-up apparatus is discussed which is provided with a function in which the user concentrates on shooting the moving image when shooting the image and then selects his or her favorite shot from the shot moving images to generate the still image only after the shooting.

More specifically, a video camera is discussed which generates the still image at a moment when the user presses a record button just when a favorite scene appears while the moving image is being played back.

Further, the conventional technology includes a still image capture apparatus which has a function for sequentially generating the still images from the input moving images at a predetermined interval when the record button is pressed (for example, Japanese Patent Application Laid-Open No. 2001-54053).

According to the still image capture apparatus discussed in Japanese Patent Application Laid-Open No. 2001-54053, since the still image is generated after the moving image is shot, the user can concentrate on shooting the moving image at the time of the shooting. Thus, the burden on the user can be decreased.

However, if the record button for generating the still image continues to be pressed when the still images are sequentially generated at the predetermined interval while the moving image is being played back, various troubles can be caused. For example, if the interval for generating the still image is set in a frame unit, since as many as thirty pieces of still images are generated from a one-second moving image, a large number of unnecessary still images are generated.

As a result, the user may have big a burden to find out the shot afterward. Further, since a large number of unnecessary still images are generated, a capacity of the recording media is wasted. Particularly, when the scene of the moving image is switched while the record button continues to be pressed, all still images shot after the scene is switched become unnecessary unless there is a specific reason.

Similarly, when the moving image is paused during playback, all still images generated from the moving image while the moving image is paused become unnecessary unless there is a specific reason.

SUMMARY OF THE INVENTION

According to an aspect of the present invention, an image processing apparatus includes a generation unit configured to continuously generate still images from a moving image which is being read out from a recording medium and played back, a detection unit configured to detect a change of a playback state of the moving image which is being read out from the recording medium and played back, and a control unit configured to control an operation of the still image generation unit. The control unit performs control to stop generating of the still image when the detection unit detects that the playback state of the moving image during playback is changed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 5 illustrates a conventional situation in which the still images are continuously generated even after a scene is switched.

DESCRIPTION OF THE EMBODIMENTS

Various exemplary embodiments, features, and aspects of the invention will be described in detail below with reference to the drawings.

Figure 1:
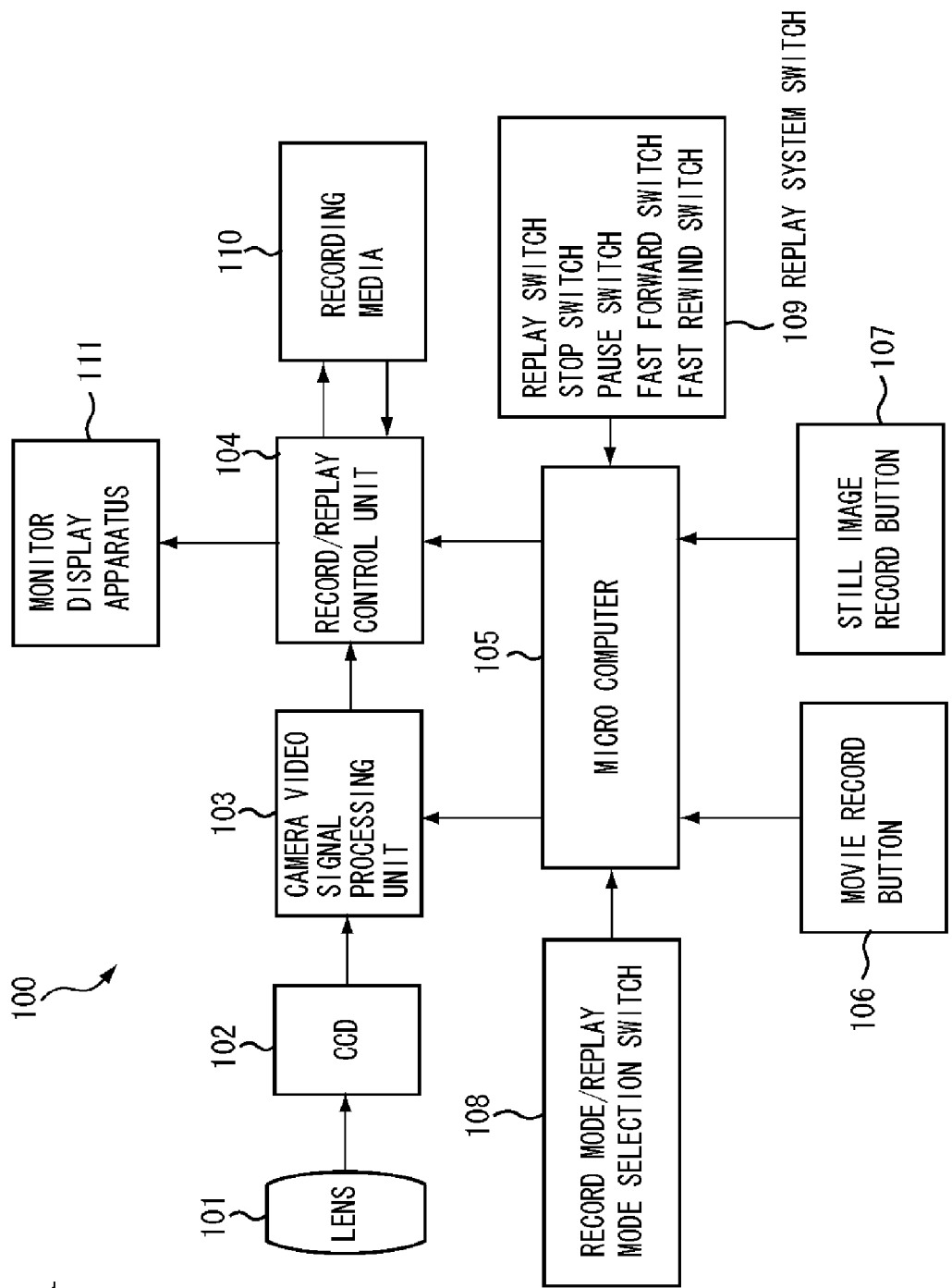
FIG. 1 is a block diagram illustrating a configuration example of an image pick-up apparatus according to an exemplary embodiment of the present invention.

A first exemplary embodiment of the present invention will be described below with reference to Figs. FIG. 1 is a block diagram illustrating a configuration example of an image pick-up apparatus 100 including an image processing apparatus according to an exemplary embodiment of the present invention.

In FIG. 1, an optical zooming lens 101 is a photographic lens, and a CCD 102 is an image sensor which converts an optical image captured by the optical zooming lens 101 into an electric signal.

A camera video signal processing unit 103 performs camera video signal processing to adjust a video signal output from the CCD 102 to meet a predetermined camera video standard, and generates moving image data and still image data. A recording medium 110 records the standardized video signal and the still image.

A record/playback control unit 104 records the compressed video signal in a recording medium 110 and reads out the video signal from the recording medium 110 to playback the video signal. A microcomputer 105 controls an entire system, and a moving image record button 106 gives directions to start recording the video signal in the recording medium 110.

A still image record button 107 gives directions about timing for generating the still image while the moving image is being played back. A selection switch of moving image record mode/playback mode 108 is used to switch between a moving image record mode and a moving image playback mode. A playback system switch 109 gives directions of playback, stop, pause, fast forward, and fast rewind while the moving image is being played back. A monitor display apparatus 111 displays an image while the moving image is being played back.

A specific operation by the image pick-up apparatus 100 of a present exemplary embodiment will be described. The image pick-up apparatus 100 of the present exemplary embodiment includes the moving image record mode and the moving image playback mode. According to the present exemplary embodiment, the moving image playback mode is selected by the selection switch of moving image record mode/playback mode 108.

An object image which enters through the optical zooming lens 101 is converted into the electric signal by the CCD 102 and input into the camera video signal processing unit 103. The camera video signal processing unit 103 performs white balance processing, nonlinear signal processing such as γ correction, or aperture processing on the object image. The white balance processing converts a color of appearance into a similar color to a color memorized by a human. The aperture processing adds a sense of resolution to the object image. The camera video signal processing unit 103 outputs the processed object image to the record/playback control unit 104.

The record/playback control unit 104 performs control to record the video signal in the recording medium 110. More specifically, compressing processing is performed on the video signal output from the camera video signal processing unit 103 by using codec such as moving picture experts group (MPEG) 2, MPEG 4, or advanced visual communication (AVC).H264 to decrease a recording amount, and the compressed video signal is recorded in the recording medium 110. When the user shoots the moving image, the user operates the moving image record button 106.

The microcomputer 105 detects that the moving image record button 106 is operated and outputs a direction to start recording the moving image in the record/playback control unit 104. The video signal output from the camera video signal processing unit 103 is input into the record/playback control unit 104 at a real time. The compressing processing is performed on the input video signal by using the codec such as the MPEG 2, the MPEG 4, or the AVC.H264 to decrease the recording amount, and the moving image captured in the shooting is recorded in the recording medium 110.

As an example, a case will be described in which the moving image playback mode is selected by the selection switch of moving image record mode/playback mode108.

When the moving image recorded in the recording medium 110 is played back, the playback system switch 109 is operated to playback the moving image. The playback system switch 109 includes a playback switch, a stop switch, a pause switch, a fast-forward switch, and a fast-rewind switch. When the playback switch is operated, the microcomputer 105 detects that the playback switch of the playback system switch 109 is operated and outputs the direction of playback to the record/playback control unit 104.

The record/playback control unit 104 extracts the moving image to be played back, from the recording medium 110 and playbacks the moving image. More specifically, decompressing processing is performed on the recording medium 110 by using the same codec as the codec used for the compressing processing, for example, the MPEG 2, the MPEG 4, or the AVC.H264. The video image is restored to the image which can be displayed on the monitor display apparatus 111 and output to the monitor display apparatus 111.

The user can change a display of the moving image on the monitor display apparatus 111 by operating the playback system switch 109. More specifically, the moving image data playback can be paused, fast-forwarded, or fast-rewound.

For example, when the still image is to be generated from the moving image during playback, the still image record button 107 is operated while the moving image is being played back. The microcomputer 105 detects that the still image record button 107 is operated and outputs to the record/playback control unit 104 the direction to generate the still image. The still image is generated from the moving image being played back and recorded in the recording medium 110.

More specifically, one still image is generated from two pieces of field images of an ODD image and an EVEN image included in the moving image being played back. The compressing processing is performed on the still image generated as described above by using the general codec suitable for still image such as Joint Photographic Experts Group (JPEG) and the compressed still image is recorded in the recording medium 110. For example, while the moving image having continuous motions such as a golf swing is being played back, if the still image record button 107 continues to be pressed, the still images can be continuously generated. The still images are suitable for confirming a form of the golf swing.

If the still image is generated as described above, the still image is generated from the moving image during playback for each frame and as many as thirty pieces of still images can be generated in one second. Therefore, the user cannot miss a moment when the user wants to watch the object moving at a high speed, for example the golf swing.

Figure 3:
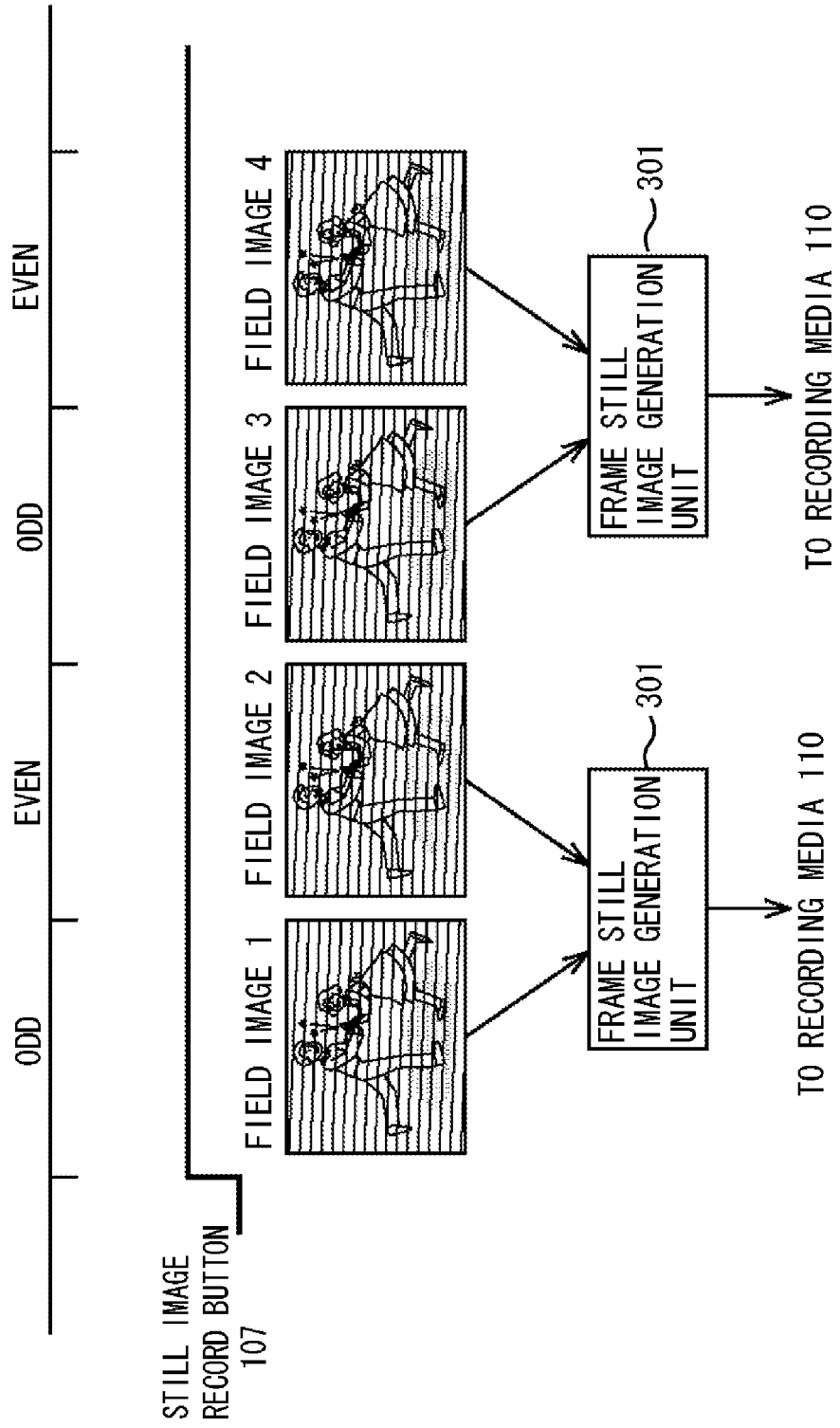
FIG. 3 illustrates processing for generating the still image from the moving image according to the exemplary embodiment of the present invention.

As illustrated in FIG. 3, the still image thus generated consists of the frame still image from field images 1 and 2. Similarly, the still image consists of a frame still image from field images 3 and 4. A frame still image generation unit 301 for generating the frame still image is included in the record/playback control unit 104.

As described above, generating as many as thirty pieces of still images in one second has a merit that the user does not miss the moment when the user wants to watch the object moving at the high speed. On the other hand, a great number of still image files are generated in this method. Therefore, the user has a trouble to find out the still image afterward. Further, since a great number of still image files are generated, the capacity of the recording medium is unnecessarily consumed.

In order to resolve such situation, according to the exemplary embodiment, generating of the still image is forcibly stopped when a change of the playback state is detected even when the still image record button 107 continues to be pressed.

For example, when the still images are continuously generated by keeping pressing the still image record button 107 while the moving image is being played back, if the pause button is pressed by the playback system switch 109, generating the still image may be stopped.

That is because in a state of pausing, the moving image being played back remains stopped and the stopped moving image is displayed on the monitor display apparatus 111. In this state, the same images are alternately output to the ODD and the EVEN. In other words, if the frame images are generated from the ODD and the EVEN in this state, the same still image are continuously generated and a great number of unnecessary still images are generated. For the reason described above, when the switch other than the playback switch in the playback system switch 109 is operated, generating of the still image may be forcibly stopped.

Further, also when the scene is switched, generating of the still image may be stopped. That is because, if the still image record button 107 is operated to obtain the still image, this operation means that the scene includes the desired still image. Thus, the still image is barely desired after the scene has been switched.

Figure 4:
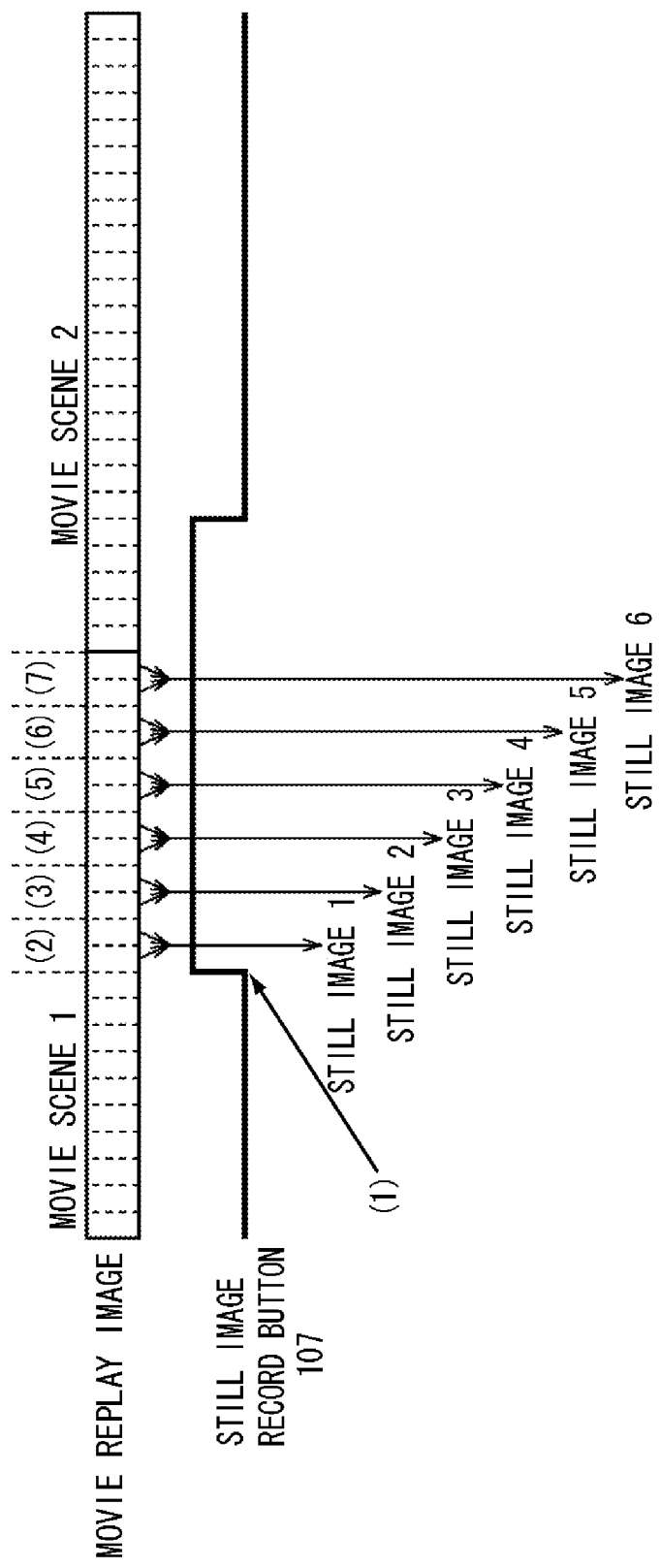
FIG. 4 illustrates processing for generating the still image from the moving image according to the exemplary embodiment of the present invention.

More specifically, more descriptions will be added with reference to FIGS. 4 and 5. In FIG. 5, when the still image record button 107 is operated at a timing of (1) in a moving image scene '1', the frame image is generated by using a pair of the ODD and the EVEN from the moving image being played back. For example, when the still image record button 107 is pressed at the timing of (1) in the moving image scene '1', a still image '1' is generated from the pair of (2) in the moving image scene '1'.

Further, if the still image record button 107 continues to be pressed, a still image '2' from the pair of (3), a still image '3' from the pair of (4), a still image '4' from the pair of (5), a still image '5' from the pair of (6), a still image '6' from the pair of (7) are continuously generated. Furthermore, a still image '7' from the pair of (8), and a still image '8' from the pair of (9) are continuously generated.

Since an operation of the still image record button 107 is stopped at the timing that the still image '8' is generated, generating of the still image is stopped. A trouble is that, since the user keeps pressing the still image record button 107 from a latter half part of the moving image scene '1', the still images are continuously generated even after the moving image scene '1' is switched to the moving image scene '2'.

As a result, since the moving image scene '1' and the moving image scene '2' are highly likely that they have no relationship with each other, unnecessary still images may be generated. In such a case, as illustrated in FIG. 4, when the operation by the still image record button 107 reaches a first half part of the moving scene '2', it is detected that the scene is switched from the moving image scene '1' to the moving image scene '2'.

The still image should not be generated at the timings of the still images '7' and '8'. To detect that the scene is switched, file management information existing in each scene is detected by the microcomputer 105, and whether the scene is switched is determined from the acquired management information.

Figure 2:
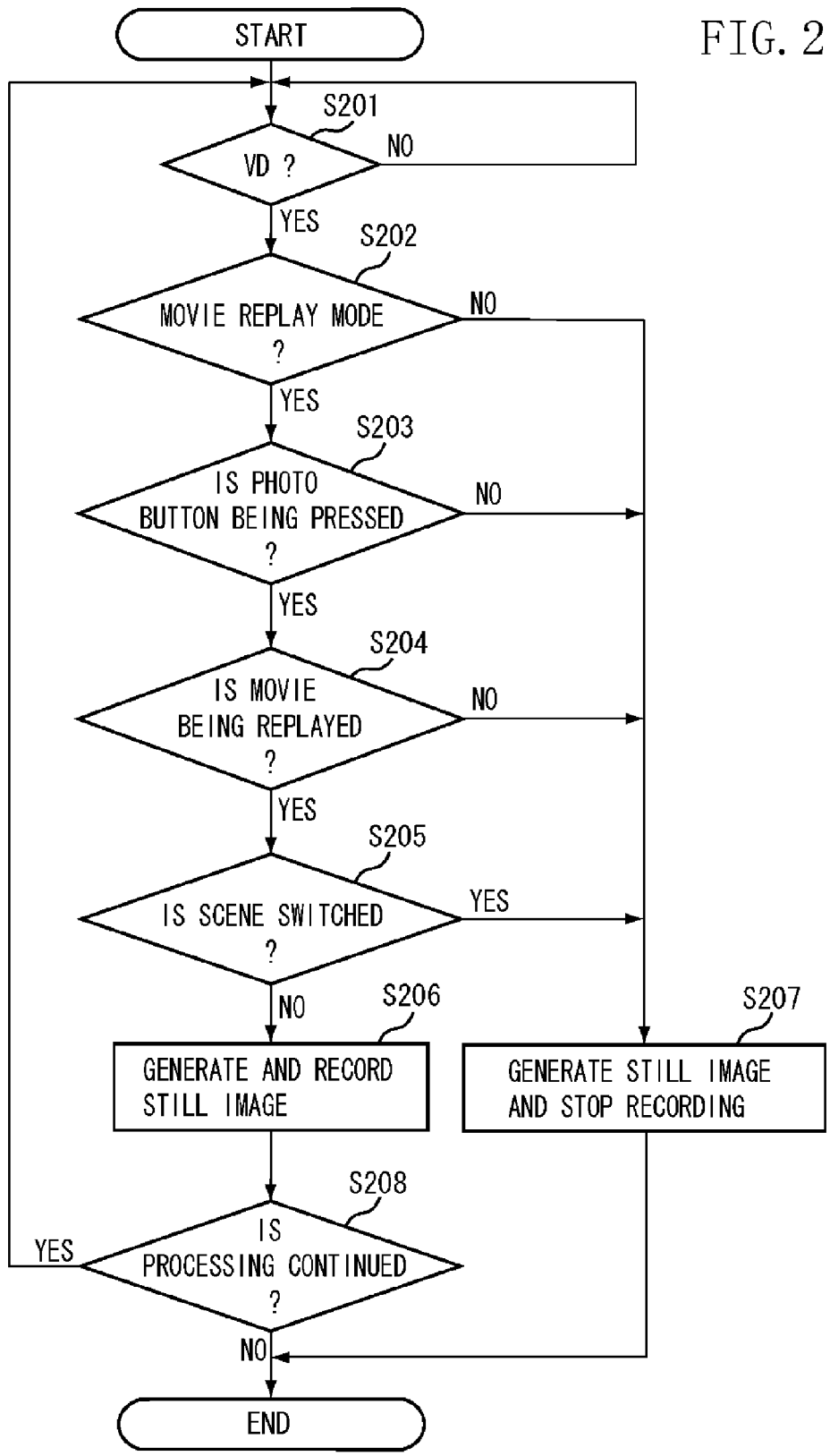
FIG. 2 is a flowchart illustrating a specific flow of processing in which generation of a still image is forcibly stopped while a moving image is being played back according to the exemplary embodiment of the present invention.

A specific flow of processing in which generating and recording of the still image are forcibly stopped by the microcomputer 105 while the moving image is being played back, will be described with reference to the flowchart in FIG. 2.

Since the processing for replaying the moving image is performed in a field unit, a series of processing is performed at timing equivalent to a general vertical synchronizing signal. The above-described processing is repeated every time the vertical synchronizing signal is generated. In the flowchart in FIG. 2, this processing is performed in step S201.

More specifically, in step S201, whether the vertical synchronizing signal (VD) is input is determined. When it is determined that the VD is not input (NO in step S201), the processing waits until the VD is input. If in step S201, it is determined that the VD is input (YES in step S201), the processing proceeds to step S202.

In step S202, it is determined whether the selection switch 108 of moving image record/playback mode is set to the moving image playback mode. When the moving image record mode is selected (NO in step S202), the processing proceeds to step S207. In step S207, generating and recording the still image is stopped.

In step S202, when the moving image playback mode is selected (YES in step S202), the processing proceeds to steps S203, S204, and S205 to perform playback state detection to detect the change of the playback state in the moving image data which is being read out from the recording medium 110 and played back.

In step S203, it is detected whether the still image record button (photo button) 107 continues to be pressed. When the still image record button 107 does not continue to be pressed (NO in step S203), the processing proceeds to step S207, and generating and recording of the still image are stopped. When the still image record button 107 continues to be pressed (YES in step 203), the processing proceeds to step S204.

In step S204, after the playback system switch 109 is operated, it is detected whether the moving image is currently being played back. When the moving image is not being played back (NO in step S204), the processing proceeds to step S207 to stop generating and recording the still image. When the moving image is being played back (YES in step S204), the processing proceeds to step S205.

In step S205, it is detected whether the scene is switched while the moving image is being played back. When the scene is not switched (NO in step S205), the processing proceeds to step S206 to generate and record the still image. In step S206, when the still image is generated and recorded, the processing proceeds to step S208 at a predetermined interval, or every time the predetermined pieces of still image are generated.

On the other hand, if it is detected that the scene is switched (YES in step S205), the processing proceeds to step S207 to stop generating and recording the still image, and then the processing proceeds to step S208.

In step S208, it is determined whether generating and recording of the still image is to be continued. When the still image record button 107 continues to be pressed (YES in step S208), it is determined that the generating and recording of the still image is to be continued, and the processing returns to step S201 to execute the processing described above.

On the other hand, it is determined in step S208 that generating and recording of the still image is not to be continued when the still image record button 107 is not pressed, the stop operation is performed, or no more relay images remain, and the processing ends.

In addition to the cases described above, when the stop switch for stopping replaying the moving image is pressed, the pause switch for temporarily stopping replaying of the moving image is pressed, the fast-forward switch for fast-forward replaying of the moving image during playback is pressed, or the first-rewind switch for fast-rewind replaying of the moving image during playback is pressed, it is determined that generating and recording of the still image in step S208 is not to be continued.

As described above, in the image pick-up apparatus 100 of the present exemplary embodiment, when the still images are continuously generated by an operation of the record button while the moving image is being played back in the moving image playback mode, if the switching of the scene is detected, generating of the still image is forcibly stopped. Thus, generating of the unnecessary still image can be prevented. Thus, the convenient image processing apparatus and image pick-up apparatus can be realized.

When the still images are continuously generated by the operation of the record button while the moving image is being played back in the moving image playback mode, if the state is changed to other state than normal playback, generating of the still image is forcibly stopped. With this arrangement, only necessary still image can be generated. Thus, the convenient image processing apparatus and image pick-up apparatus can be realized.

Each unit included in the image processing apparatus and the image pick-up apparatus according to the exemplary embodiment of the present invention described above can be realized by an operation of the program stored in a random access memory (RAM) and a read only memory(ROM) of a computer. The program and a computer-readable recording medium recording the program are included in the present invention.

Further, the present invention can be applied to other exemplary embodiments, for example a system, an apparatus, a method, a computer program or a recording medium. More specifically, the present invention can be applied to a system including a plurality of devices. Alternatively, the present invention can be applied to an apparatus including a single device.

According to the present invention, a program of software for executing each process in the above-described image processing method (the program corresponding to the flowchart illustrated in FIG. 2 in the exemplary embodiment) is supplied directly or remotely to the system or the apparatus. Further the present invention can be realized by the system or the computer of the apparatus which reads out and executes the program code to realize the present invention.

Thus, in order to realize functional processing of the present invention by using the computer, the program code itself installed in the computer also realizes the present invention. In other words, the present invention includes the computer program itself for realizing the functional processing of the present invention.

In that case, the computer program may be formed in script data to be supplied to the program or an operation system (OS) executed by an object code or an interpreter, as long as the computer program has a function of the program.

Various recording media can be used as the medium for supplying the program, for example, a flexible disk, a hard disk, an optical disk, a magnet-optical disk (MO), a compact disc-ROM (CD-ROM), a CD-recordable (CD-R), a CD-Re-Writable (CD-RW), a magnetic tape, a non-volatile memory card, a ROM, and a digital versatile disk (DVD) (DVD-ROM, DVD-R).

Additionally, in order to supply the program, a connection may be made to the website of the Internet by using a browser of a client computer and downloading the computer program itself of the present invention from the website or a compressed file including an automatic installation function into the recording medium such as the hard disk.

Further, the present invention can be realized by dividing the program code included in the program of the present invention into a plurality of files and downloading the files from different websites. In other words, the present invention includes the World Wide Web (WWW) server for allowing a plurality of users to download the program files to realize the functional processing of the present invention in the computer.

Furthermore, the program of the present invention is encrypted and stored in the recording medium such as the CD-ROM, and distributed to the user. The user who can meet a certain condition is allowed to download key information for encryption from the website via the Internet. The key information is used to execute the encrypted program and install the program into the computer to realize the present invention.

Moreover, the computer executes the read out program to realize the function of the above-described exemplary embodiment. In addition, the OS running in the computer executes a part or all of the actual processing to realize the function of the above-described exemplary embodiment.

Further, the program read out from the recording medium is written into a memory included in a function extension board inserted in the computer or a function extension unit connected to the computer. Based on the direction of the program, a central processing unit (CPU) included in the function extension board or the function extension unite executes a part or all of the actual processing to realize the function of the above-described exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus comprising:
a generation unit configured to continuously generate still images from a moving image which is being read out from a recording medium and played back while recording of still image is instructed to generate the still images;
a detection unit configured to detect a change of a playback state of the moving image; and
a control unit configured to control an operation of the generation unit,
wherein the control unit performs control to automatically stop generating of the still image by the generation unit during the playback of the moving image when the detection unit automatically detects the change of the playback state of the moving image, while recording of still image is instructed to generate the still image,
wherein the detection unit automatically detects that the playback state of the moving image is changed in response to a scene of the moving image during playback is switched.

2. An image processing apparatus comprising:
a generation unit configured to continuously generate still images from a moving image which is being read out from a recording medium and played back while recording of still image is instructed to generate the still images;
a detection unit configured to detect a change of a playback state of the moving image; and
a control unit configured to control an operation of the generation unit,
wherein the control unit performs control to automatically stop generating of the still image by the generation unit during the playback of the moving image when the detection unit automatically detects the change of the playback state of the moving image, while recording of still image is instructed to generate the still image,
wherein the detection unit automatically detects a change of the playback state of the moving image in response to the playback state of the moving image is switched to the playback state other than normal playback.

3. The image processing apparatus according to claim 2, wherein the change of the detected playback state of the moving image includes pause in replaying of the moving image, fast-forward replay, and fast-rewind replay.

4. An image processing method comprising:

continuously generating still images from a moving image which is being read out from a recording medium and played back while recording of still image is instructed to generate the still images;

detecting a change of a playback state of the moving image;

controlling an operation of the generating of the still image; and controlling to automatically stop generating of the still image during the playback of the moving image when the detecting automatically detects the change of the playback state of the moving image, while recording of still image is instructed to generate the still image, wherein the detecting automatically detects that the playback state of the moving image is changed in response to a scene of the moving image during playback is switched.

5. An image processing method comprising:

continuously generating still images from a moving image which is being read out from a recording medium and played back while recording of still image is instructed to generate the still images;

detecting a change of a playback state of the moving image; and a control unit configured to controlling an operation of the generating of the still image; and performing control to automatically stop generating of the still image during the playback of the moving image when the detecting automatically detects the change of the playback state of the moving image, while recording of still image is instructed to generate the still image, wherein the detecting automatically detects a change of the playback state of the moving image in response to the playback state of the moving image is switched to the playback state other than normal playback.

6. The image processing method according to claim 2, wherein the change of the detected playback state of the moving image includes pause in replaying of the moving image, fast-forward replay, and fast-rewind replay.

* * * * *